United States Patent [19]

Harbaugh et al.

[11] Patent Number: 4,832,900

[45] Date of Patent: May 23, 1989

[54] TEST TOOL FOR A REACTOR VESSEL FLUID LEVEL INSTRUMENTATION

[75] Inventors: Thomas D. Harbaugh; James A. Murtha, both of Monroeville; Michael E. Podobnik, Plum Boro, all of Pa.

[73] Assignee: Westinghouse Electric Corp., Pittsburgh, Pa.

[21] Appl. No.: 186,719

[22] Filed: Apr. 22, 1988

Related U.S. Application Data

[63] Continuation of Ser. No. 830,319, Feb. 18, 1986, abandoned.

[51] Int. Cl.$^4$ .............................................. G21C 17/00
[52] U.S. Cl. ................................. 376/259; 376/258; 364/578; 324/73 R; 434/218; 73/1 H; 73/865.6
[58] Field of Search ......................... 376/258, 259, 245; 324/73 R, 158 R; 364/578, 801; 434/218; 73/1 H, 865.6, 308

[56] References Cited

U.S. PATENT DOCUMENTS

| | | | |
|---|---|---|---|
| 3,830,090 | 8/1974 | Hersch et al. | 73/1 H |
| 3,903,403 | 9/1975 | Ferguson et al. | 376/259 |
| 4,250,750 | 2/1981 | Martinec et al. | 73/308 |
| 4,270,178 | 5/1981 | Lillig | 324/73 R |
| 4,293,916 | 10/1981 | Del Re et al. | 364/578 |
| 4,302,288 | 11/1981 | Youngborg | 376/258 |
| 4,337,657 | 7/1982 | Morris | 73/308 |
| 4,441,157 | 4/1984 | Gerchman et al. | 73/1 H |
| 4,454,747 | 6/1984 | Ecuer et al. | 73/1 H |
| 4,517,839 | 5/1985 | Van Dyke | 324/73 R |
| 4,567,761 | 2/1986 | Fajeau | 376/258 |
| 4,583,223 | 4/1986 | Inoue et al. | 324/73 R |
| 4,606,227 | 8/1986 | Walters | 73/865.6 |
| 4,639,349 | 1/1987 | Baratta et al. | 376/258 |
| 4,640,812 | 2/1987 | Sawyer et al. | 376/259 |
| 4,649,015 | 3/1987 | DeVolpi | 376/258 |
| 4,664,870 | 5/1987 | Hager | 376/259 |
| 4,692,298 | 9/1987 | Coradi et al. | 376/259 |
| 4,699,753 | 10/1987 | Rohosky et al. | 376/259 |
| 4,762,663 | 8/1988 | Cook et al. | 376/259 |
| 4,783,307 | 11/1988 | Galligan et al. | 376/217 |

Primary Examiner—Deborah L. Kyle
Assistant Examiner—Daniel Wasil
Attorney, Agent, or Firm—D. C. Abeles

[57] ABSTRACT

A test tool for a reactor vessel level instrumentation system which simulates and verifies the values of input signals applied to the instrumentation system. The test tool includes potentiometers for simulating the signals produced by resistance temperature detectors, switches for simulating pump status and isolator overrange limit signals, a power supply, resistors and potentiometers for simulating temperature hot sensors and a pressure wide range sensor, and potentiometers and resistors for simulating differential pressure cell signals. The invention also includes a switchable meter for verifying the values of the various input signals simulated.

19 Claims, 7 Drawing Sheets

TEST TOOL FOR A REACTOR VESSEL FLUID LEVEL INSTRUMENTATION

This application is a continuation of application Ser. No. 06/830,319, filed Feb. 18, 1986, now abandoned.

BACKGROUND OF THE INVENTION

The present invention is directed to a test tool for a nuclear reactor vessel level instrumentation system and, more particularly, the present invention is directed to a test tool for a computer controlled instrumentation system which measures fluid level in a pressurized water nuclear reactor and compensates for changes in measured values of core coolant fluid level due to fluid temperature changes, fluid pressure changes caused by core coolant pump operation, coolant outlet temperature changes, and core coolant inlet pressure changes to obtain an actual fluid level.

Figure 1A:
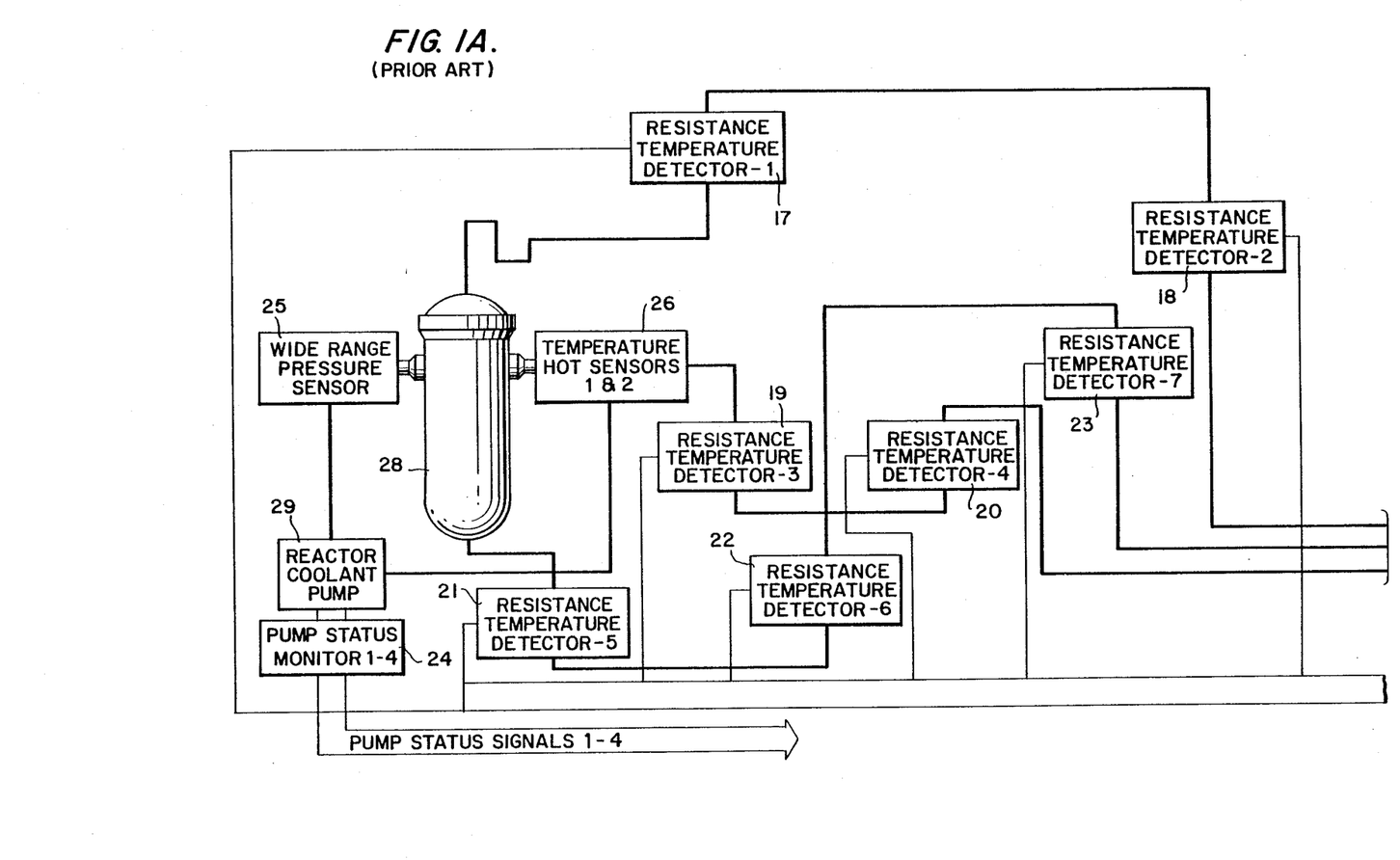
FIGS. 1A and 1B are a block diagram of a reactor vessel level monitoring system and the reactor vessel level instrumentation system 10 connected thereto for monitoring reactor coolant fluid level.
Figure 1B:
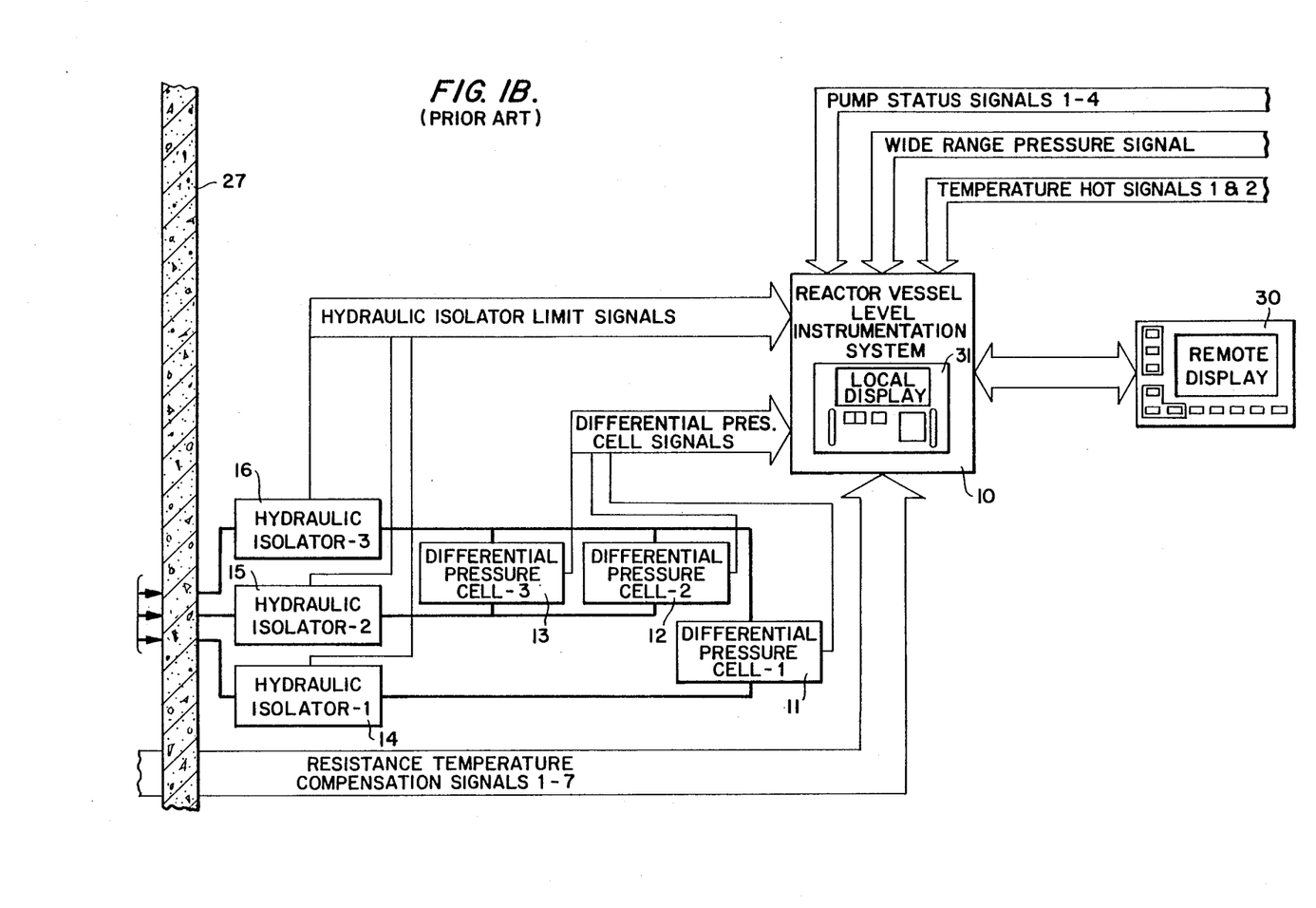

The present invention interfaces with the reactor vessel level instrumentation system (RVLIS) 10 of FIG. 1 at the electrical field line terminal blocks and substitutes for or simulates various signals supplied by the fluid level monitoring system. The RVLIS equipment 10 is arranged in two identical, redundant systems; however, only one system is illustrated in FIG. 1. Each system 10 receives inputs from differential pressure cells 11-13, hydraulic isolators 14-16, resistance temperature detectors 17-23, pump status monitors 24, a wide range pressure sensor 25 and temperature hot sensors 26, and includes subsystems for sampling the various input signals and converting the values sampled into vessel fluid level using steam tables. An 8-bit or 16 bit microcomputer processing unit in the system 10 converts all the inputs into the vessel level and displays the level for plant operators.

Capillary fluid impulse lines extend through containment wall 27 to the hydraulic isolators 14-16. The hydraulic isolators 14-16 provide hydraulic coupling, isolation of lines, and limit switch inputs to instrumentation system 10 when the isolators 14-16 are overranged, that is, experiencing too much pressure. When the isolators 14-16 are overranged, the system measurements will be in error. The differential pressure cells 11-13 measure the difference in fluid height between reference lines subject to system pressure, through the hydraulic isolators 14-16, located outside the containment wall and the fluid level in the reactor vessel 28. The impulse lines inside the containment wall 27 will be exposed to temperature increases which change the fluid density which must be taken into account in vessel level determination. Strap-on resistance temperature detectors 17-23 are located on each vertical run of separately routed impulse lines to determine the impulse line temperature. This temperature is used to correct the reference leg density contribution to the differential pressure measurement. That is, when temperature in the impulse lines changes, the density of the water changes, changing the height of water measured by cells 11-13. Changes in liquid density thus require changes in compensation for the differential pressure cell outputs. Another factor affecting reactor fluid level measurement is the status of reactor coolant pumps 29. Whenever the pumps 29 are on the differential pressure in the reactor vessel 28 is higher than when off, therefore, pump status across the core is provided by pump status monitors 24 to allow calculation of actual reactor fluid level. Depending upon which of four possible coolant pumps 29 are operating, the coolant differential pressure across the core varies which also varies the indicated fluid level within the vessel. The differential pressure across the core is measured by the wide range pressure sensor 25. Another factor that must be considered when calculating vessel fluid level is coolant fluid outlet temperature which is measured by temperature hot sensors 26. Whenever coolant temperature is high coolant density is low and the output of the differential pressure cells 11-13 must be compensated therefor.

The 8 or 16 bit microprocessor within the RVLIS 10 samples the various sensors discussed above and displays vessel liquid level on a remote display 30 that is viewed by plant operators. The system 10 also includes a local display 31 which is used by maintenance technicians to test the system. The local display 31 is capable of not only displaying reactor vessel fluid level, but all of the various input signals used to calculate the fluid level. The reactor vessel level instrumentation system 10 of FIG. 1 can be purchased from Westinghouse Electric Corporation. The 8-bit microcomputer based system is called the RVLIS while the 16 bit microcomputer based system is called the RVLIS-86.

Prior to the present invention, dummy inputs were supplied to the RVLIS by using edge connectors on the various circuit boards which bypassed all interface circuits and analog-to-digital converters.

SUMMARY OF THE INVENTION

It is an object of the present invention to allow testing of all inputs at the electrical field connection terminal blocks of a reactor vessel level instrumentation system (RVLIS).

It is another object of the present invention to test all RVLIS circuits including interface and conversion circuits.

It is still another object of the present invention to simulate changes in the input signals to the RVLIS.

It is a further object of the present invention to provide a test tool which is suitable for training maintenance technicians and power plant operators.

It is an additional object of the present invention to provide a test tool suitable for testing the RVLIS before installation.

The present invention provides a tool which simulates all inputs for a reactor vessel level instrumentation system. The test tool includes a device for providing variable resistance values to simulate the inputs provided by resistance temperature detectors and which comprises resistance temperature detector potentiometers. The test tool also includes a device for simulating pump status signals and hydraulic isolator overranged signals which comprises status and limit switches. The present invention further includes a device for simulating temperature hot sensors, differential pressure cell sensors and pressure wide range sensors which comprise potentiometers. The present invention also includes a meter which allows the test tool operator to compare the value of the signal output by the test tool with the value measured and displayed by the instrumentation system.

These, together with other objects and advantages, which will be subsequently apparent, reside in the details of construction and operation and more fully hereinafter described and claimed, reference being had to the accompanying drawings forming a part hereof, wherein like reference numerals refer to like parts throughout.

DESCRIPTION OF THE PREFERRED EMBODIMENTS

The test tool of the present invention provides for simulation of all the level monitoring signals encountered in Westinghouse Electric Corporation pressurized water nuclear reactors, including resistance temperature detector signals, pump status and hydraulic isolator overrange limit signals, reactor coolant outlet temperature sensor signals, differential pressure cell signals and reactor coolant inlet pressure sensor signals. The test tools for both the 8-bit 9RVLIS) and 16-bit (RVLIS-86) reactor vessel level instrumentation system are designed to accommodate the maximum number of sensors that will be encountered in the field. Whenever a sensor is not present on site, the simulator or testing signal generator circuit associated with that sensor need not be corrected.

Figure 2:
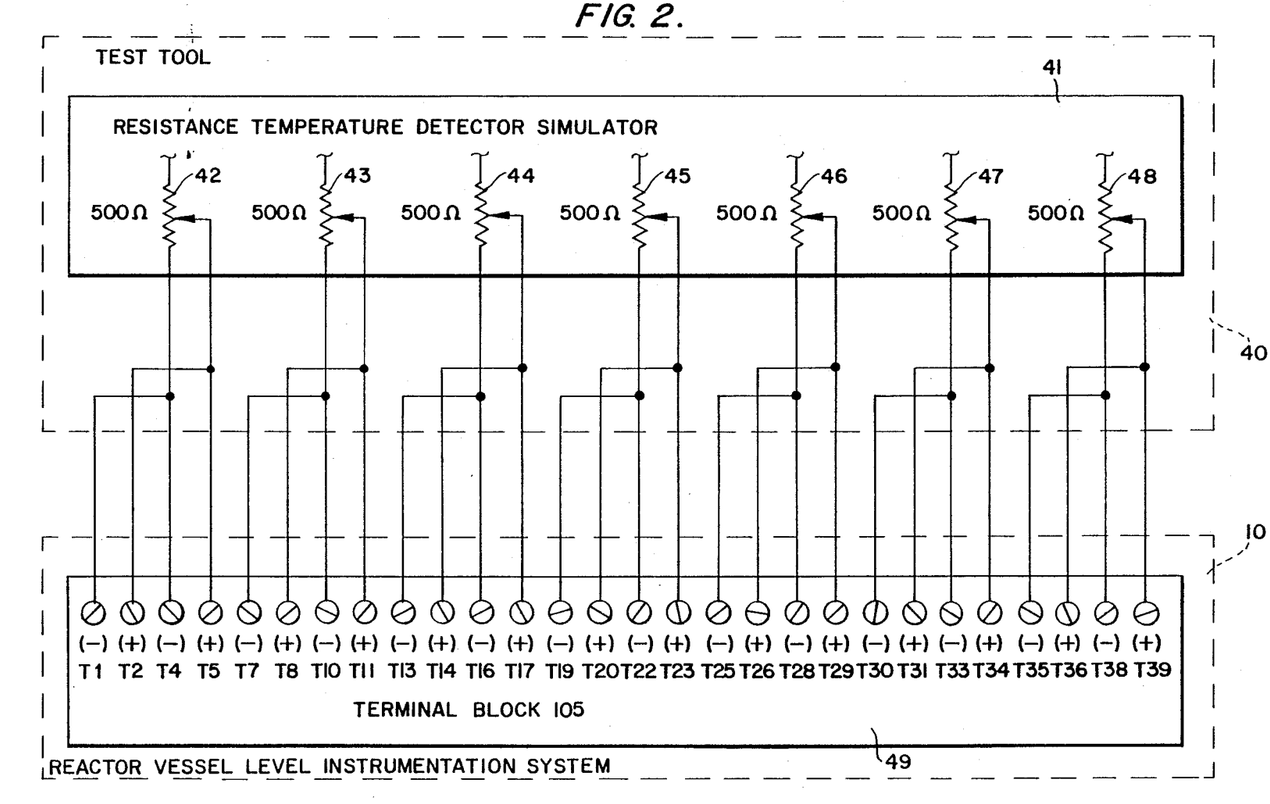
FIG. 2 illustrates a resistance temperature detector simulator 41 and how it is connected to an 8-bit microprocessor based instrumentation system.

FIG. 2 illustrates a test tool 40 connected to an 8-bit microprocessor based RVLIS 10. The test tool 40 includes a resistance temperature detector simulator 41 comprising 500 ohm potentiometers 42-48 for simulating temperature measured by resistance temperature detectors 17-23 (FIG. 1). Seven potentiometers 42-48 are provided because seven is the maximum number of resistance temperature detectors which will be encountered in the field. The potentiometers 42-48 need not be precision potentiometers, but must have the ability to handle up to 1 volt and 1 milliamp of current, and must be lockable so that a set value will not drift. The potentiometers 42-48 are connected to the appropriate terminals T1-T39 of the associated terminal block 49 in the instrumentation system 10 as shown in FIG. 2. The particular terminal block 49 in the 8-bit RVLIS is terminal block 105 and care must be taken that the wiper arms of the potentiometers are not connected to the negative terminals (−). During operation, the negative terminal (−) of each terminal pair provides a 1 milliamp current to the associated potentiometer supplied by an operational amplifier in the instrumentation system 10. As the potentiometer is adjusted, the voltage will vary between 0 and 0.5 volts. A twenty-eight wire cable connects the simulator 41 to a terminal block 49 and should have spade lug connectors on the RVLIS side for ease of connection. The cable need not be of a special type, but the wire should be at least 22 gauge. A military lockable connector can be used on the test tool 40 side.

Figure 3:
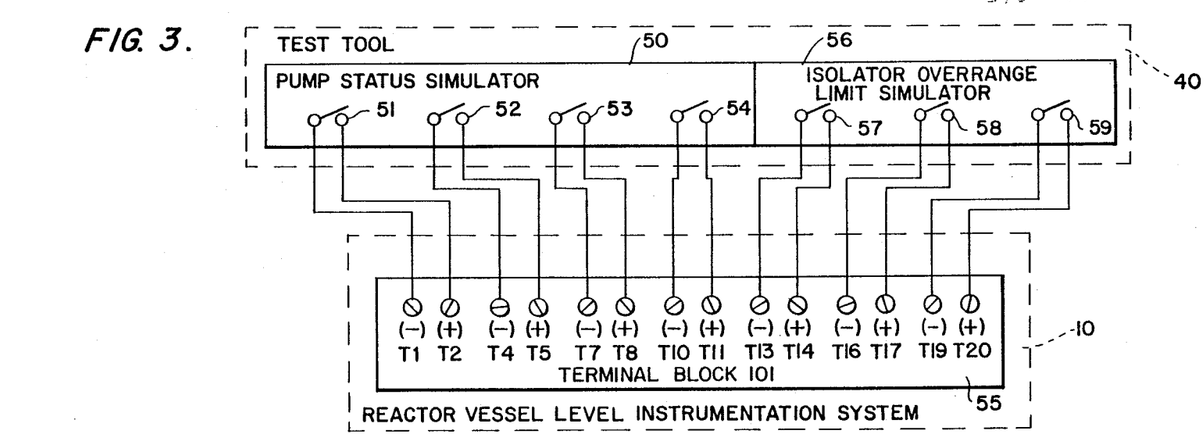
FIG. 3 illustrates both a pump status simulator 50 and an isolator overrange limit simulator 56 and how they are connected to the 8-bit microprocessor based instrumentation system.

FIG. 3 illustrates a pump status simulator 50 of the test tool 40 connected to the RVLIS 10. The pump status simulator comprises pump status switches 51-54. Four pump status switches 51-54 are provided since this is the maximum number of reactor coolant pumps that will be encountered in the field. The switches can be any type of single-pole, single-throw switch capable of transmitting a +5 volt signal. The pump status switches 51-54 are connected to terminals T1-T11 of the associated terminal block 55 in the instrumentation system 10, as shown in FIG. 3. When the pump status simulator 50 is operated, a five volt signal supplied by a positive terminal (+) is returned to the instrumentation system 10 through the negative terminal (−). The presence of a 5 volt detection signal on the negative terminal simulates a run or on status of a corresponding reactor coolant pump as produced by pump status monitors 24.

FIG. 3 also illustrates an isolator overrange limit simulator 56 which simulates overrange limit signals produced by hydraulic isolators 14-16 (FIG. 1) and which comprises ordinary single-pole, single-throw switches 57-59. The switches 57-59 are connected to terminal points T13-T20 of terminal block 55, as shown in FIG. 3. The terminal block 55 in the 8-bit RVLIS is designated as terminal block 101. During operation, the limit switches 57-59, when closed, return a +5 volt detection signal to the RVLIS which simulates liquid pressure exceeding the associated hydraulic isolator's range.

A fourteen conductor wire cable with spade lug connectors on the RVLIS 10 side should be provided for connecting the pump status simulator 50 and isolator limit overrange limit simulator 56 to the instrumentation system 10. A military lockable connector can be used on the test tool 40 side.

Figure 4:
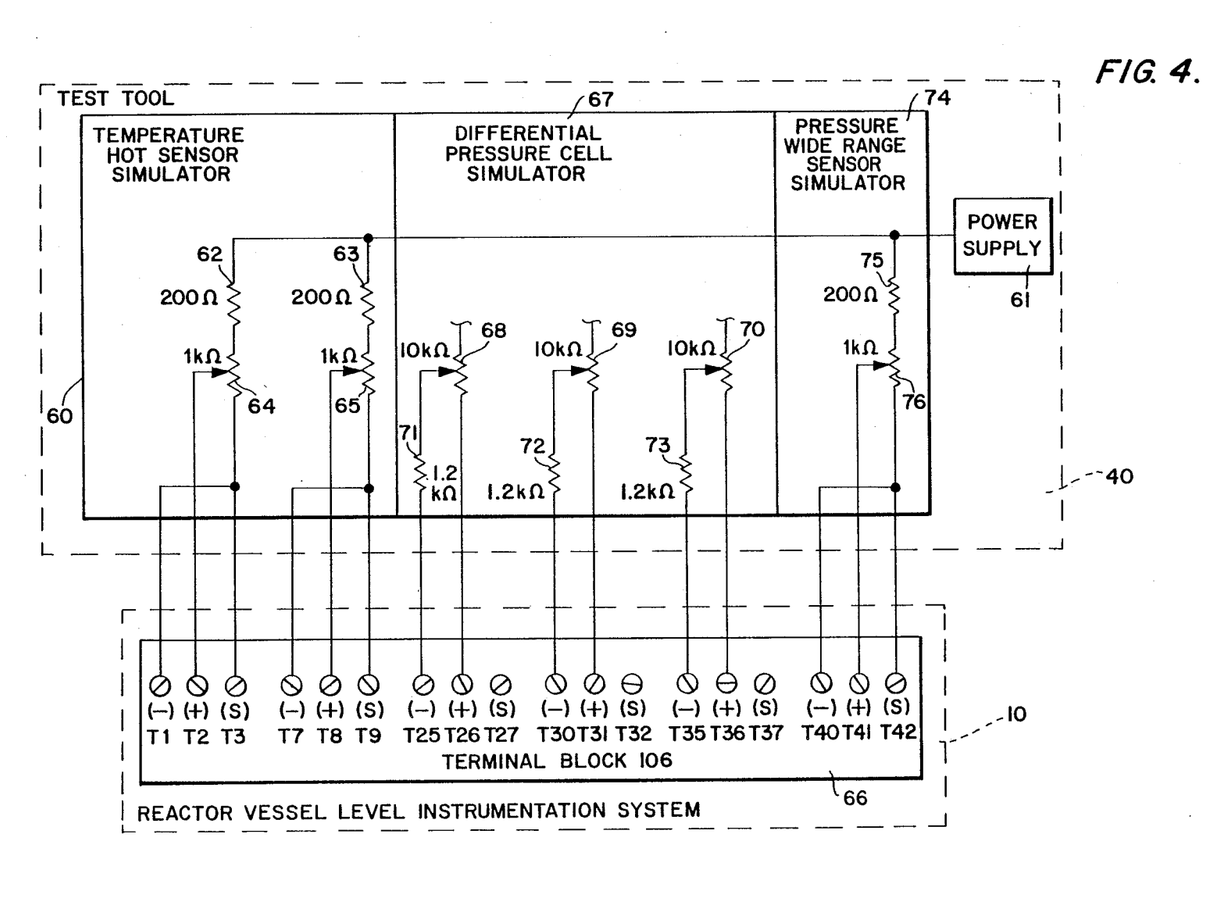
FIG. 4 illustrates the simulators for the temperature hot sensor 60, the differential pressure cell 67 and the pressure wide range sensor 74 and how these simulators are connected to the 8-bit microprocessor based instrumentation system.

FIG. 4 illustrates a temperature hot sensor simulator 60 connected to the instrumentation system 10 and which simulates coolant outlet temperature sensors 26. The temperature hot simulator is connected to a five volt power supply 61 which can be an off-the-shelf power supply as long as it has a ten percent voltage accuracy and will supply 250 milliamps of current. The power supply is connected to 200 ohm resistors 62 and 63 within the temperature hot simulator 60. The 200 ohm resistors are connected to 1 kilo ohm potentiometers 64 and 65 which are connected to the instrumentation system 10. The resistors 62 and 63 and potentiometers 64 and 65 need not be precision; however, the potentiometers need to be the lockable type so that the a value will not change. The temperature hot sensor simulator 60 is connected to terminals T1-T9 of the associated thermal block 66 in the instrumentation system 10. Care must be taken to ensure that the wiper arm of each potentiometer is connected to the positive terminal (+). During operation, as the potentiometers 64 and 65 are operated, the simulator 60 will provide a signal with a range of either 1-5 volts or 0.2-1 volt, depending upon whether the termination within the RVLIS 10 is a 50 or 250 ohm termination. The test tool 40 operator need not be concerned with the termination resistance, only with the possible range of the produced signals.

FIG. 4 also illustrates a differential pressure cell simulator 67 which simulates variations in differential pressure detected by cells 11-13 (FIG. 1) and which includes 10 kilo ohm potentiometers 68-70 which should also be lockable. Between the wiper arm of the potentiometers 68-70 and the terminal block 66 are 1.2 kilo ohm resistors 71-73. The potentiometers 68-70 and resistors 71-73 need not be precision components. Three resistor/potentiometer pairs are provided in the simulator 67 because three is the maximum number of differential pressure cells which will be encountered in the field. The differential pressure simulator 67 is connected to terminals T25-T37 of terminal block 66. During operation, as the potentiometers 68-70 are adjusted, the RVLIS produces thirty volts and the current is varied between 2 and 23 milliamps by the potentiometers 68-70.

FIG. 4 additionally illustrates a pressure wide range sensor simulator 74 connected to the power supply 61 and which simulates the wide range pressure sensor 25 (FIG. 1). The pressure wide sensor simulator includes a 200 ohm resistor 75 connected to the power supply 61 and a 1 kilo ohm lockable potentiometer 76 connected between the 200 ohm resistor and the terminal block 66 in the instrumentation system 10. The connection of the simulator 74 to the terminal T40-T42 includes a connection to the shield terminal(s) of the terminal block 66 and care must be taken to connect the wiper arm of potentiometer 76 to the positive terminal (+). The terminal block 66 in the 8-bit microprocessor based Westinghouse RVLIS is terminal block 106. During operation, as the potentiometer 76 is adjusted, a signal similar to the signals produced by the temperature hot simulator 60 will be produced.

A nineteen conductor wire cable including spade lug connectors on the RVLIS 10 side is used to connect the temperature hot simulator 60, differential pressure cell simulator 67 and pressure wide range sensor simulator 74 to the instrumentation system 10. A military lockable connector can be used on the test tool 40 side.

Figure 5:
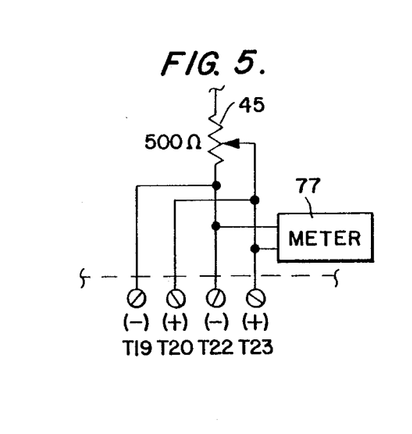
FIGS. 5-7 illustrate how a meter 77, for monitoring the value of the output signals, is connected to the resistance temperature detector simulator 41, the temperature hot sensor simulator 60, the pressure wide range sensor simulator 74 and the differential pressure cell simulator 67.
Figure 6:
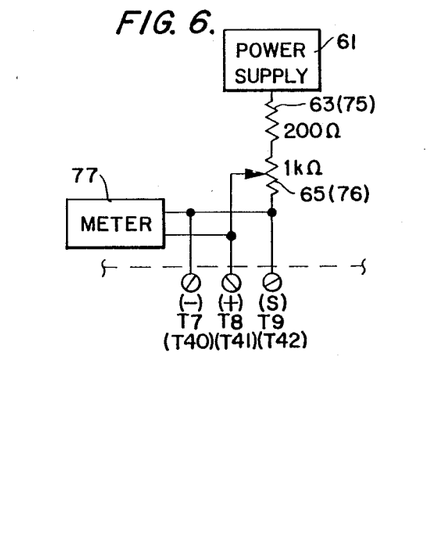
Figure 7:
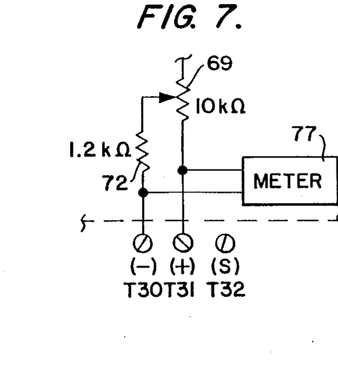

FIGS. 5-7 illustrate how a meter 77 is connected to the different simulators to allow visual verification of the value of the signal being input into the instrumentation system 10. The meter must always be connected between the positive (+) and negative (−) conductors. Between the meter and the various simulators, a 13 position selectable switch can be provided for connecting the meter 77 to the appropriate simulator. As an alternative, banana plugs could be used to connect the meter 77 to the appropriate simulator. The meter 77 can be a standard off-the-shelf meter capable of measuring milliamp currents, resistances varying between zero and approximately 15 kilo ohms and voltages varying from zero to fifteen volts. Two volt meters 77 should be provided so that at least two signals can be monitored at the same time.

Figure 8:
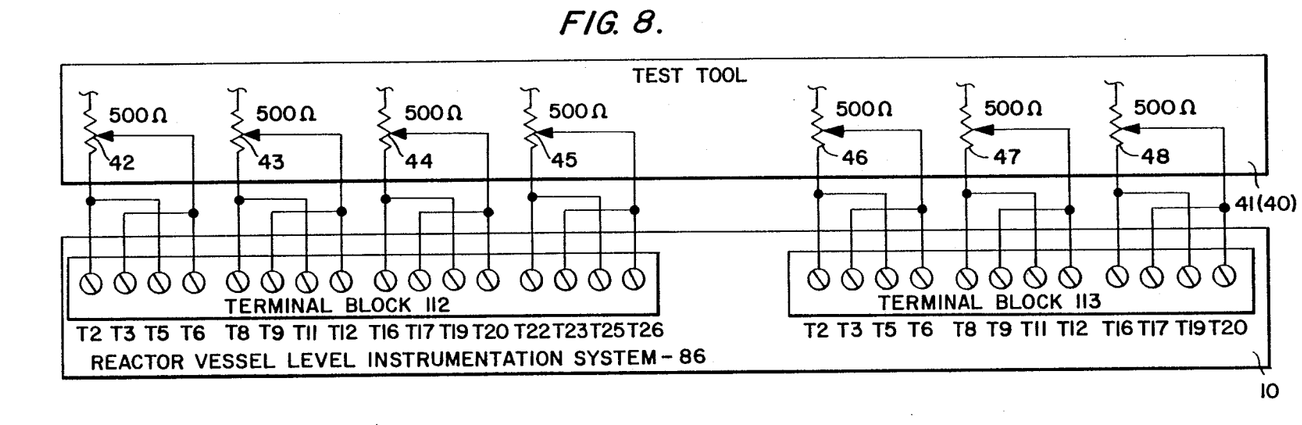
FIGS. 8-11 illustrate the components and connections for the test tool for the 16 bit microprocessor based instrumentation system RVLIS-86.

FIG. 8 illustrates the resistance temperature detector simulator portion of the test tool 40 for the 16 bit microprocessor based instrumentation system RVLIS-86. The potentiometers 42-48 are the same as depicted in FIG. 2. However, the potentiometers 42-48 are connected to terminal blocks 112 and 113 within the RVLIS-86.

Figure 9:
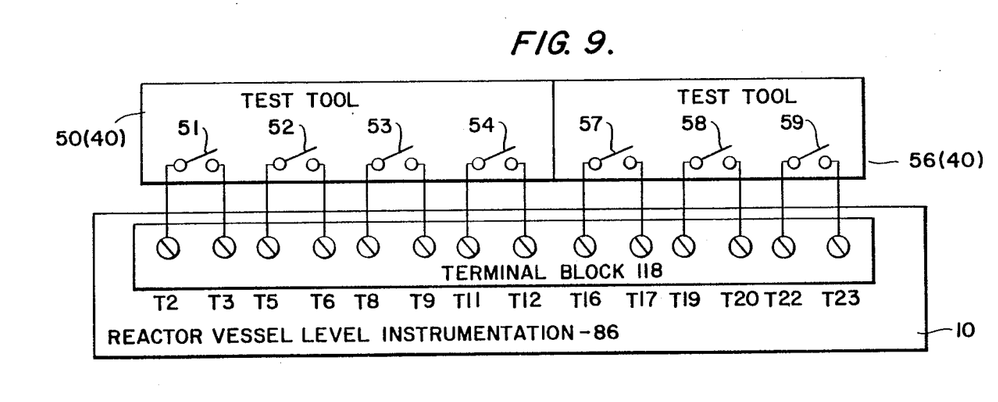

FIG. 9 illustrates the connections of the pump status simulator switches 51-54 and the isolator overrange limit switches 57-59 to terminals T2-T23 on terminal block 118 of the RVLIS-86.

Figure 10:
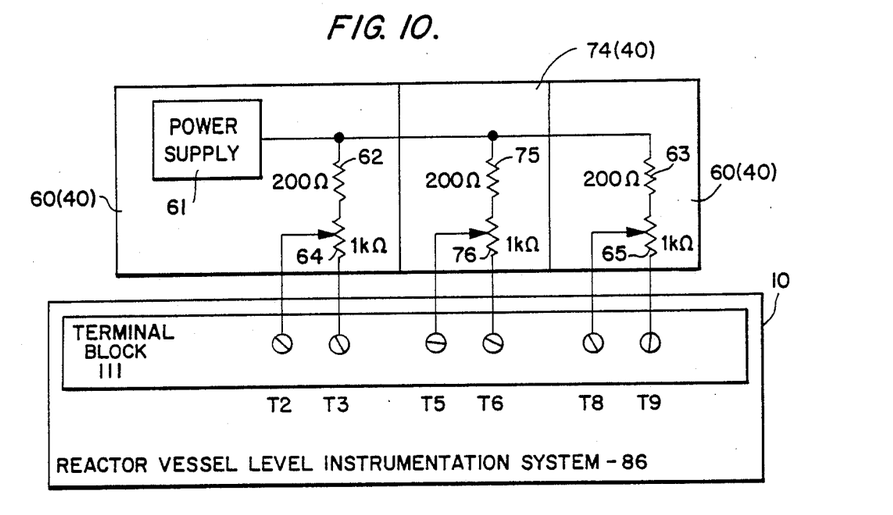

FIG. 10 illustrates the power supply 61, resistors 62, 63 and 75 and potentiometers 64, 65 and 76 which simulate the temperature hot sensors and pressure wide range sensor as they are connected to terminals T2-T9 on terminal block 111 of the RVLIS-86.

Figure 11:
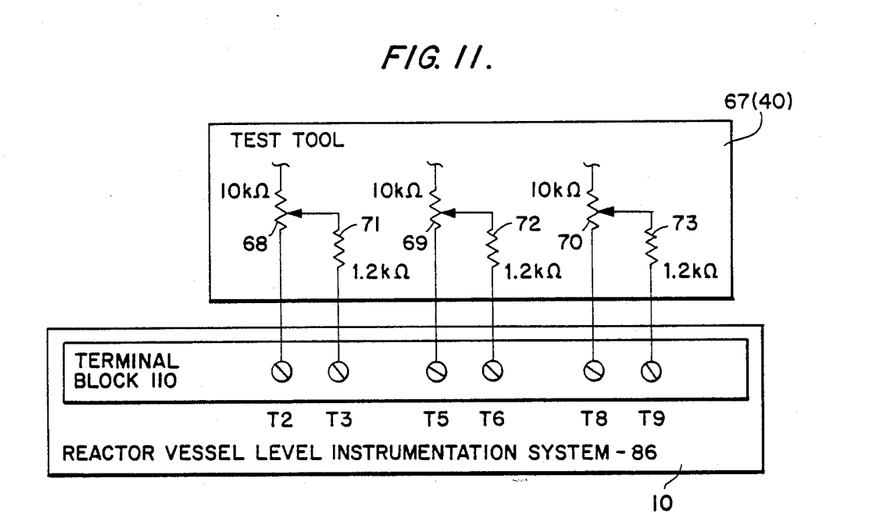

FIG. 11 illustrates the potentiometers 68-70 and resistors 71-72 for simulating the differential pressure cells and how they are connected to the terminals T2-T9 on terminal block 110 of the RVLIS-86.

As discussed with respect to the 8-bit RVLIS, the connections of the potentiometer wiper arm conductors of the RVLIS-86 test tool to the proper terminals must correct to ensure proper operation of the test tool. When visual verification of the output of the RVLIS-86 test tool 40 is required, a meter 77 would be connected to the various potentiometers in the same manner as illustrated in FIGS. 5-7. The resistors and potentiometers in the RVLIS-86 test tool need not be precision components and all the wiring terminations at the instrumentation system side should be spade lug connections for ease of use while a military connector can be used on the test tool side.

As illustrated in the various figures, the test tool will allow all of the input signals to a light water pressurized reactor vessel level instrumentation system to be simulated throughout their ranges and, thus, allow a technician to test the system or allow training of operators.

In connecting the test tool to the RVLIS, the RVLIS equipment must be de-energized. To replace the field wiring to the RVLIS with the test tool inputs, the test tool operator must first identify the terminal boards shown in the test tool in the connecting wiring diagrams of the associated figures. The associated terminal blocks are located in the rear of the local display cabinet. The appropriate field wiring connections are removed from the terminal boards and the test tool is connected to the designated terminals. Once the terminal connections are verified, the power supply in the test tool is plugged in and energized. During operation, the technician should be able to see the associated measured values change on the local display 31 as the input values change along with the corresponding changes in vessel level associated with the input value change. When the technician wants to verify the value of the output signal, meter 77 can be connected to the appropriate simulator circuit. For example, when a resistance temperature simulated value is changed, this change should show up on a local display. However, the display associated with actual reactor vessel fluid level should not change. If a hydraulic isolator overrange limit signal is simulated, an alarm should appear on both the local display 31 and the remote display 30. Whenever a differential pressure cell is simulated, the local display should show the change in the value of the pressure cell signal as well as a change in reactor fluid level and the remote display 30 should only show a change in reactor fluid level. If the technician wants to verify proper operation of the remote display 30, a spare remote display can be jumpered at the instrumentation system cabinet.

The many features and advantages of the invention are apparent from the detailed specification and, thus, it is intended by the appended claims to over all such features and advantages of the test tool which fall within the true spirit and scope of the invention. Furthermore, since numerous modifications and changes will readily occur to those skilled in the art, it is not desired to limit the invention to the exact construction and operation illustrated and described, and, accordingly, all suitable modifications and equivalents may be resorted to, falling within the scope of the invention.

We claim as our invention:

1. A test tool for a nuclear reactor vessel fluid level instrument system, comprising:
   means for providing continuously variable, active analog test signals to the instrumentation system, said means for providing comprising:
   potentiometers, connectable to the instrumentation system, for providing a variable resistance to the instrumentation system;
   switches, connectable to the instrumentation system, for returning a detection signal unmodified to the instrumentation system; and
   variable voltage means for providing a variable voltage to the instrumentation system; and means for verifying values of the test signals.

2. A test tool as recited in claim 1, wherein said means for verifying comprises a meter, switchably connectable to either said variable resistance means or said variable voltage means, for measuring the variable resistance or variable voltage provided to the instrumentation system.

3. A test tool as recited in claim 2, wherein said variable voltage means comprises:
   a power supply;
   a resistance connected to said power supply; and
   a potentiometer connected to said resistance and connectable to the instrumentation system.

4. A test tool for a nuclear reactor vessel fluid level instrumentation system including a temperature compensation system, a pump status system, a hydraulic isolator system, a temperature hot system, a differential pressure system and a pressure wide range system, said test tool comprising:
   compensation testing means for testing the temperature compensation system;
   pump status testing means for testing the pump status system;
   isolator testing means for testing the hydraulic isolator system;
   temperature testing means for testing the temperature hot system;
   pressure testing means for testing the differential pressure system; and
   wide range testing means for testing the pressure wide range system.

5. A test tool as recited in claim 4, wherein said compensation testing means comprises means for providing a variable voltage drop to the temperature compensation system.

6. A test tool as recited in claim 5, wherein said means for providing comprises at least seven potentiometers connectable to the temperature compensation system.

7. A test tool as recited in claim 4, wherein said pump status testing means comprises means for transmitting a voltage therethrough.

8. A test tool as recited in claim 7, wherein said means for transmitting comprises at least four switches connectable to the pump status system.

9. A test tool as recited in claim 4, wherein said isolator testing means comprises means for transmitting a voltage therethrough.

10. A test tool as recited in claim 9, wherein said means for transmitting comprises at least three switches connectable to the hydraulic isolator system.

11. A test tool as recited in claim 4, wherein said temperature testing means comprises means for providing a variable voltage to said temperature hot system.

12. A test tool as recited in claim 11, wherein said means for providing comprises:
   a voltage power supply; and
   a variable resistance connected to said voltage power supply and connectable to the temperature hot system.

13. A test tool as recited in claim 12, wherein said variable resistance comprises at least two potentiometers connected to said power supply and connectable to the temperature hot system.

14. A test tool as recited in claim 4, wherein said pressure testing means comprises means for providing a variable current to the differential pressure system.

15. A test tool as recited in claim 14, wherein said means for providing comprises:
   at least three potentiometers connectable to the differential pressure system, each potentiometer having a wiper arm; and
   at least three resistors connected to the corresponding wiper arm and connectable to the differential pressure system.

16. A test tool as recited in claim 14, wherein said wide range testing means comprises means for providing a variable voltage to the pressure wide range system.

17. A test tool as recited in claim 16, wherein said means for providing comprises:
   a voltage power supply; and
   a variable resistance connected to said voltage power supply and connectable to the pressure wide range system.

18. A test tool for a pressurized water nuclear reactor vessel fluid level instrumentation system, the instrumentation system having a temperature compensation subsystem receiving resistance temperature detector signals, a pump status subsystem receiving pump status signals, a hydraulic isolator subsystem receiving isolator limit signals, a temperature hot subsystem receiving reactor coolant temperature signals, a differential pressure cell subsystem receiving differential pressure cell signals, and a pressure wide range subsystem receiving wide range pressure signals, said test tool comprising:
   first potentiometers, connectable to the temperature compensation subsystem, for providing substitute resistance temperature detector signals and used for testing the temperature compensation subsystem;
   pump status switches, connectable to the pump status subsystem, for providing substitute pump status signals and used for testing the pump status subsystem;
   isolator switches, connectable to the hydraulic isolator subsystem, for providing substitute isolator limit signals and used for testing the hydraulic isolator subsystem;
   a power supply;
   second potentiometers, connected to said power supply and connectable to the temperature hot subsystem, for providing substitute reactor coolant temperature signals and used for testing the temperature hot subsystem;
   third potentiometers, connectable to the differential pressure cell subsystem, providing substitute differential pressure cell signals and used for testing the differential pressure cell subsystem; and a wide range potentiometer, connected to the power supply and connectable to the pressure wide range subsystem, for providing a substitute wide range pressure signal and used for testing the pressure wide range subsystem.

19. A test tool as recited in claim 18, further comprising a meter, switchably connectable to said first potentiometers, said second potentiometers, said third potentiometers and said wide range potentiometer, for verifying produced signal values.

* * * * *